Figure 1:
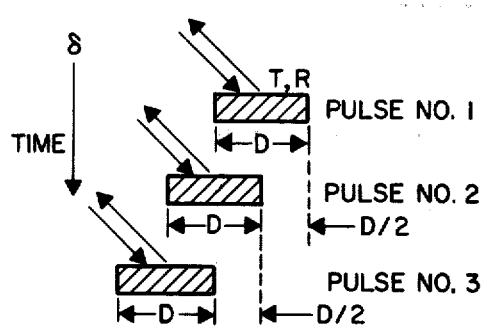

United States Patent
Kock

[11] 3,895,381
[45] July 15, 1975

[54] SYNTHETIC APERTURE IMAGING SYSTEMS

[76] Inventor: Winston E. Kock, 903 Oakdale Rd., Ann Arbor, Mich. 48105

[22] Filed: Feb. 21, 1973

[21] Appl. No.: 265,705

[52] U.S. Cl. ............ 343/5 CM; 340/5 MP; 343/17
[51] Int. Cl. .............................................. G01s 9/02
[58] Field of Search ........ 343/5 CM, 17; 340/5 MP

[56] References Cited
UNITED STATES PATENTS

| | | | |
|---|---|---|---|
| 2,932,021 | 4/1960 | Chaffee | 343/17 |
| 3,048,837 | 8/1962 | Hart | 343/17 |
| 3,381,264 | 4/1968 | Lauergne et al. | 343/5 CM |
| 3,548,642 | 12/1970 | Flaherty et al. | 340/5 MP |
| 3,603,992 | 9/1971 | Goggins, Jr. et al. | 343/5 CM |

Primary Examiner—Maynard R. Wilbur
Assistant Examiner—G. E. Montone

[57] ABSTRACT

A procedure for use in synthetic aperture imaging systems is described whereby the well-known range — ambiguity limitation of such systems is avoided. In place of the single, transmit-receive transducer normally used, additional receive-only transducers are employed, placed ahead of the moving transmit-receive unit, and along its line of motion. Because the signals received by the added receive-only transducers are equivalent to those which would later have been received in the usual system from later pulses, these later pulses can be omitted. The pulse spacing in time can accordingly be increased, permitting information from much greater ranges to be received and processed.

2 Claims, 5 Drawing Figures

SYNTHETIC APERTURE IMAGING SYSTEMS

Synthetic aperture imaging systems are finding wide use in many kinds of energy radiating systems, including ultrasonic systems used in medical applications for the examination of the interior of living bodies, and side-looking microwave radar systems, one of which was recently used in an extensive mapping procedure of the Amazon River basin (where cloud cover prevents adequate photographic mapping). These imaging systems have the important advantage that the aperture of the transducer (i.e. - the energy radiator and energy receiver, which is an acoustic radiator and receiver in the case of the ultrasonic systems, and is an antenna in the case of the microwave systems) need not be large to achieve high quality resolution. The process itself yields a synthetic aperture many times the size of the actual aperture, whereby extremely fine detail can be obtained in the final record.

The method by which this is accomplished is described very thoroughly for ultrasonic imaging systems in U.S. Pat. No. 3,548,642, issued Dec. 22, 1970, and incorporated here by reference. This patent also refers to an August 1966 publication "On the application of Coherent Optical Processing Techniques to Synthetic-Aperture Radar" by L. J. Cutrona et al., Proc. IEEE, Vol. 54, No. 8, August 1966, pp. 1026-1032, incorporated here by reference in which details of a comparable microwave system are described. Because of the very complete description found in the patent mentioned, the discussion here will use an ultrasonic imaging system as an exemplary one, although it will be obvious to one skilled in the art that the concept described is equally applicable in other fields of wave energy, including microwaves (radar), light waves (lidar), etc.

It is well known that in spite of the very significant advantages possessed by the snythetic aperture process, one serious drawback has always been inherent in the process. This drawback is referred to as the ambiguity constraint, and has been described in numerous publications on synthetic perture systems, including a 1969 paper "An Introduction to Synthetic Aperture Radar" by W. M. Brown et al., IEEE Spectrum, September 1969, pp. 52-62, incorporated by reference, which stated "the ambiguity problem associated with synthetic aperture side-looking radar" (is) "one that does put a constraint on its usefulness . . . the constraint . . . indicates that at least one pulse must be transmitted whenever the aircraft (the transducer) moves a distance D/2," where D is the actual aperture dimension of the transducer employed.

A simple way of explaining this ambiguity constraint is by noting that all synthetic aperture systems generate one dimensional zone plates (as noted in the patent and the 1966 publication referred to). To delineate these zone plates, particularly the end portions of them, where the detail is greatest, an adequate number of pulses must be radiated and received. This requires a pulse repetition rate which is large enough (i.e. - the pulses must be spaced closely enough) to accomplish this result. Unfortunately, closely spaced pulses also result in a short maximum range for such systems, and it is this range limitation which is the "ambiguity constraint." The concept described here provides for a proper delineation of the zone plate pattern through the use of additional receiving transducers placed ahead of the usual single, transmit-receive unit. Fewer pulses can then be employed and an increased range capability is thereby obtained.

As an aid in explaining the new procedure, the standard synthetic aperture process will briefly be reviewed. In such systems, a transducer is caused to move along a straight line. This transducer generates a fairly wide along-the-track beam. A reflecting object located in a direction encompassed by this beam and near enough to satisfy the round trip pulse repetition time requirement, returns an echo pulse which is received by the transducer. The phase of the received signal is referred to the phase of the highly stable oscillator (which is used to generate the outgoing pulse and to then act as a reference). The relative phase of these two signals is dependent upon the range of the object (slant range). If the returning signal has a phase equal to that of the reference oscillator, the two signals will add (by means of a process called synchronous detection), in other words, constructive interference will occur. For successively later positions of the moving transducer, during which additional pulses will have been radiated, the distance (the range) to the object will have diminished. This will cause the returning signal to differ in phase first by 90° from the reference, then by 180°, then by 270°, and then by 360° and so on. These signals, when combined with the reference signal, (through synchronous detection), will generate additions at the zero and 360° points, subtractions at the 180° points, and very little effect at the 90° and 270° points. This process, as is well known, will cause the varying, synchronously detected, signal to print, on moving film, a one-dimensional zone plate, which commences at the time the point reflector (the object) enters the transducer beam, and ends as the forward motion of the transducer causes it to pass through and leave the beam. At the time of initiation of the zone plate, the transducer is moving rapidly toward the reflector and the additions and subtractions occur rapidly. As the transducer comes abreast of the point reflector, the range is changing more slowly, and similarly, the additions and subtractions are also generated more slowly. It is this initially rapid, on-off, recording, which gradually changes to a slow, on-off, recording, which constitutes the zoneplate. Optical processing procedures, using coherent (laser) light, enable such a single reflecting point (along with many others) to be reconstructed, resulting in a sharply detailed photograph of the area under examination.

The requirement, in synthetic aperture systems, to delineate adequately the many one-dimensional zone plates caused by the various reflection points, places an undesirable limit on the maximum range which such systems can handle adequately (this is the ambiguity problem mentioned above). The concept here described overcomes this range limitation, without affecting the system's ability to delineate with precision the area of interest. This is accomplished by the use of a plurality of moving transducers positioned along the line of motion. The additional transducers are receive-only, and the signals they receive are, as in the case of the signals received by the single transmit-receive transducer, combined with the ihghly stable reference signal (again through the process of synchroms detection). The combinations of these received signals with the reference signal, whether the results are additive or subtractive, are also photographically recorded. Because these receive only transducers are positioned along the line of motion, their numerous received signals can delineate, with fewer pulses, the outlines of the one-dimensional zone plates just as well as the more numerous pulses utilized in the standard synthetic aperture technique.

Figure 2:
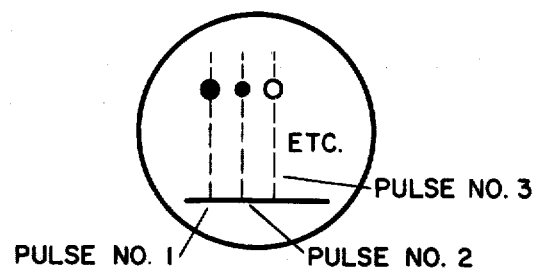
Figure 3:
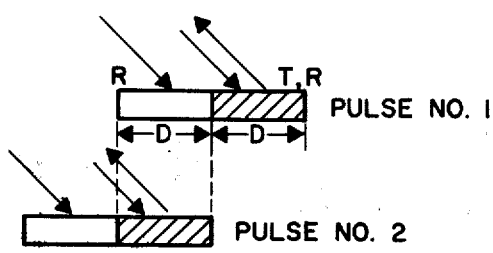
Figure 4:
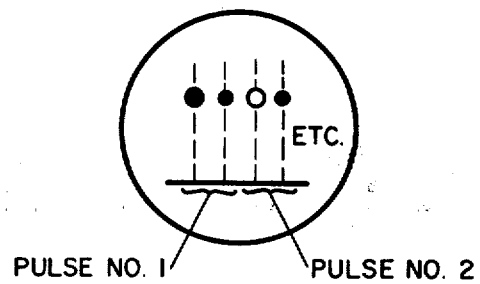
Figure 5:
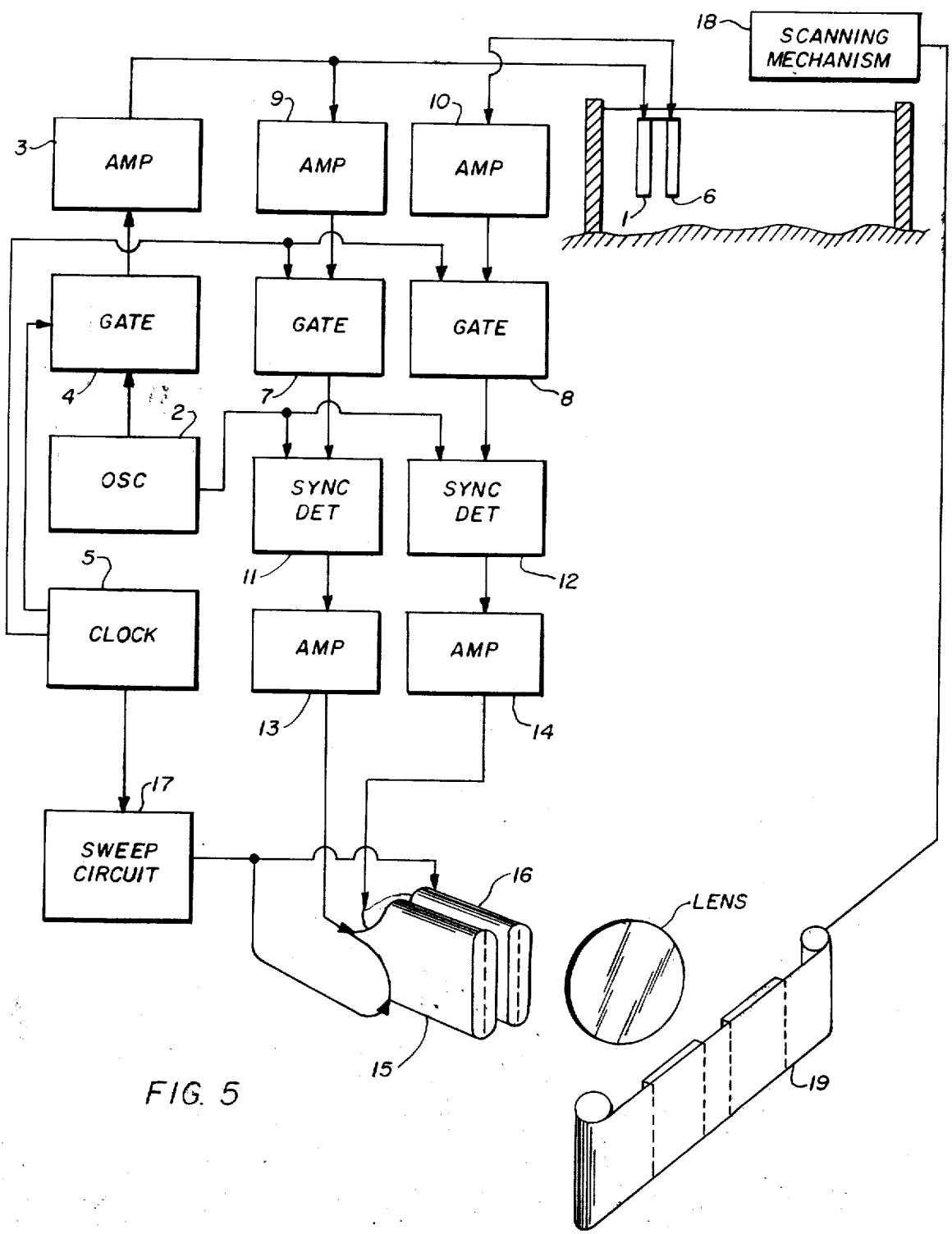

To describe the new process in a more detailed manner, FIGS. 1 through 5 are included, with FIGS. 1 and 2 portraying the action of the standard synthetic aperture process, and FIGS. 3, 4 and 5 portraying the new procedure.

FIGS. 1 and 2 are therefore prior art. Considering now FIG. 1, the top drawing portrays the transmission of the first pulse from the moving (transmit-receive) transducer, and the reception of an echoing pulse returning from a point reflector. Upon its return, the phase (the position of the wave crests and troughs) is compared with the phase of a reference wave (by synchronous detection). Let us assume that for this case the waves in the returning pulse are in phase with the reference wave. The next lower diagram shows the transducer having moved forward a distance D/2 (where D is the actual aperture width of the transducer), at which time a second pulse is transmitted (and received). For this case, the transducer has moved nearer to the (stationary) point reflector, and the path length out to the reflector and back is accordingly shorter. The wave train comprising the pulse therefore returns more quickly than it did in the case of the first pulse. Let us assume that this shortening of the travel time causes the second received pulse to be 90° advanced in phase relative to the reference signal. The next lower figure portrays the transmission and reception of a third pulse, with the transducer again having moved forward a distance D/2. The transducer is now even closer to the reflector, so that the phase of the wave train differs even more than for the second pulse. We assume for this case that this phase difference is now 180° relative to the reference wave, so that the addition of this returning pulse to the reference wave causes subtractive or destructive interference, as contrasted to the first pulse, which was in-phase and which therefore produced additive or constructive interference in the synchronous detection process.

It is evident that the continued transmission of more pulses, as the transducer continues to move forward, will result in a continuation of this adding and subtracting process, and a photographic recording of this will show a line comprising a series of dark and light segments, as shown in FIG. 2. This figure represents the circular face of a cathode ray tube with the lower straight line corresponding to the series of instants when pulses are radiated. Time runs from left to right for that line, but the vertical motion of the cathode-ray-tube spot also represents the time taken by the pulse to reach the reflector and return. Shown in the diagram are the results of the three pulse transmissions just discussed. At the bottom of the first left-hand vertical, dotted, line, the pulse is radiated. While it is travelling out to the reflecting point and back, the cathode-ray tube spot moves upward in a vertical direction along the first dotted line. At one point, the elapsed time corresponds to the return time of the pulse from the reflector, with the large black circular dot signifying that the received pulse is in phase with the reference wave, and that addition has occurred.

The bottom point of the second vertical, dotted, line corresponds to the instant at which the second pulse is transmitted. Again, the cathode ray tube spot moves upward along the second dotted line, and when the pulse returns and is synchronously detected, it again affects the brightness of this moving spot. Because the phase difference is now 90°, however, the strong adding effect for the first pulse is missing, and the fact that the spot is therefore not brightened as much as for the first pulse is indicated by a smaller circular black dot. Similarly, for pulse number three, a 180° out-of-phase situation occurs, and the resulting destructive interference effect results in almost no brightening of the spot (shown as an open circle).

As more pulses are radiated and the distance from the transducer to the reflector continues to change, repetitions of this brightening and darkening of the cathode ray tube will take place, and a photographic record of this effect will be a one-dimensional zone plate.

Turning now to FIG. 3, it is seen that in the new procedure, a second receive-only transducer is caused to move with the usual transmit-receive unit. Furthermore, this second transducer is positioned ahead of the usual one by a length approximately equal to the aperture (D) of the transmit-receive unit, that is, a length equal to twice the distance, D/2, which the transducer moves during the interval between pulses as employed in the usual procedure of FIG. 1.

By virtue of its more forward position, this second, receive-only transducer receives the returning echo-signal well ahead, in time, of one received by the transmit-receive transducer, and this advanced time interval corresponds to twice the usual transducer (between pulses) travel time. By comparing this returned signal with the returned echo of pulse number 2 in FIGS. 1 and 2 it is seen that, with only one radiator pulse in FIG. 3, two received pulses are generated, one corresponding to the usual number-one pulse of FIG. 1, and the other corresponding to pulse number two in FIG. 1.

The single outgoing pulse has generated, in effect, two received pulses. These two are actually generated from the same, single, returning pulse, as produced by the single outgoing pulse. Because of the difference in position of the two receiving transducers, the path length, out and back, for the pulse arriving at the forward transducer is less by an amount equal to the distance D. Now it is noted that this was exactly the situation for pulse number two in FIG. 1; the transducer had moved forward a distance D/2, so that the path length, out and back, was less by a distance equal to twice the distance D/2, i.e. - a distance D. Accordingly, the phase of the signal picked up by the forward transducer in FIG. 3 will differ from that of the signal picked up by the transmit-receive transducer by the same amount as the difference in phase between the received pulses one and two in FIG. 1. Again, assuming that the signal returning to the rear transducer is in phase with the reference wave (so that constructive interference occurs), the returning signal picked up slightly earlier by the forward transducer will obviously again differ in phase from the reference by 90°.

Turning now to the lower sketch in FIG. 3, it is noted that in this case, the second pulse is not transmitted until after the transducers have travelled a full distance D, rather than the distance D/2 of FIG. 1. The pulse returning to the transmit-receive transducer will therefore correspond to pulse number three of FIG. 1 (there, also, the transducer had moved a distance D since the first pulse was sent out). As before, the phase of that pulse will be 180° out of phase with the reference, and destructive interference will again occur. Because the receive-only transducer still is at a distance D forward of the transmit-receive transducer, the phase of its signal (relative to the reference wave) will be still further advanced, i.e., to 270°.

FIG. 4 shows how the received outputs of the two transducers of FIG. 3 are utilized to generate the desired, usual, zone plate pattern. It, like FIG. 2, is also a sketch of a cathode ray tube. In this case, however, instead of one vertically moving electron beam, this tube is equipped with two electron beams, both independent as to their intensity, both moving side-by-side vertically along adjacent dotted lines, and both being stepped horizontally by two positions (instead of one as in FIG. 2) whenever an outgoing pulse is transmitted. The intensity of the left hand beam is modulated by the synchronously detected output of the transmit-receive transducer, and, as shown, this first, left-hand, vertical dotted line is identical to the first vertical line in FIG. 2. In addition, a second receiver and a second synchronous demodulator is connected to the forward receiving transducer, and that output is caused to modulate the intensity of the second adjacent, (right-hand), vertically moving electron beam of the cathode ray tube. The marking of this beam is shown as the second, vertical dotted line in FIG. 4. At the point corresponding to the reflector range (the out and back time of the reflected pulse), the output of this second synchronous demodulator will brighten the second beam slightly, but not as much as the first beam is (simultaneously) brightened, because the first signal is in-phase and the second is 90° displaced in phase with the reference. As the second pulse is transmitted (the lower sketch of FIG. 4), the two electron beams are returned to the lower horizontal line and stepped to the right by two steps, so that they then proceed to generate the third and fourth vertical dotted lines. When they reach the range point, beam number one has an out-of-phase input (and hence almost no brightening of it occurs). Beam number two has the 270° phase shift and a modest brightening of it takes place. As more pulses are radiated, a pattern of additions and subtractions will again be produced. Thus, through the use of two receivers, zone plate patterns are achievable even when only half the number of pulses are transmitted.

In FIG. 5 is shown a block diagram of applicants system, employing in this case a transmit-receive transducer and one receive-only transducer. The similarity to FIG. 1 of Flaherty is evident. In the transmit-mode, the transmit-receive transducer 1 receives a pulse signal from oscillator 2 and amplifier 3 as gate 4 is momentarily opened by clock 5. With the closing of gate 4, the system reverts to the receive-mode, and reflected signals (echoes) are picked up by transducer 1 and receive-only transducer 6. Clock 5 causes gates 7 and 8 to remain open during the receive-mode period, permitting the signals received by the two transducers to pass from amplifiers 9 and 10 to synchronous detectors i.e. synchronous demodulators 11 and 12, through amplifiers 13 and 14 and then to the recording system (storage system). In this case, where only 2 transducers are used, the figure shows two very narrow identical cathode ray tubes 15 and 16, both having their beams moving upward together through the action of sweep circuit 17. As Flaherty has taught, the amplidude (brightness) of the two beam spots is controlled by the synchronously detected transducer signals coming from amplifiers 13 and 14, and both upward sweeps are photographically stored on the photographic film 19. When the receive mode is complete, the same scanning mechanism 18, which moves the transducers 1 and 6, causes the film 19 to be stepped ahead, so that the next series of echoes can be recorded. As explained earlier, the time between outgoing pulses can be doubled (because of the use of two transducers) and the lower half of the record will be identical to those of previous devices, e.g. Flaherty et al. More distant echoes are recorded on the upper half of the film, a procedure not possible with previous devices because of the ambiguity constraint described earlier.

There are various types of storage systems now in use in synthetic aperture systems; the mechanism shown here is merely given as an example. Some store and process the information in real time. The method of FIG. 5 requires development of the photographic film and then illumination of it for forming the desired image of the irradiated area.

It will be evident to one skilled in the art that the concept here described is not limited to two antennas; a whole series of antennas, receivers and cathode ray beams could be employed, and each time the number of units is doubled, the number of pulses required is reduced by a factor of two. As noted above, the reduction in pulse numbers is the important feature of the concept, since it is that feature which overcomes the serious range limitation (the ambiguity restriction) now facing synthetic aperture systems. Even in the example discussed in connection with FIGS. 3 and 4, only one pulse was radiated for every two for the standard case as discussed in connection with FIGS. 1 and 2, and this permits a doubling of the maximum range before ambiguities occur. In effect, the receivers can wait twice as long in receiving reflections from the most distant targets, thus permitting objects located at twice the range to be examined. Had four transducers been employed, a second factor of two in maximum range would have been achieved.

This concept, although discussed here in terms of the ultrasonic imaging implementation, is readily seen to be equally applicable in microwave and other imaging procedures. In acousting applications, the limitation on the maximum range (due to ambiguities) has always been recognized as the most serious drawback. This is because the velocity of sound, being so much lower than the velocity of light, places very severe limitations both on the maximum useful range and on the maximum permissible speed of the moving transmit-receive transducer.

As in the standard use of synthetic aperture radar, deviations of the transducer motion (from uniform speed and a straight line course) can be compensated for electrically i.e. - without bodily moving the transducers to take such variations into account). Also, the use of the usual optical processing techniques are fully applicable in the scheme described here. As noted, the concept is applicable to any synthetic aperture imaging system using any type of wave energy (sound waves, microwaves, light waves, infra-red waves, etc).

Also, in the employment of some fixed transducers arrays (e.g. - a linear array) the synthetic aperture technique is often used, whereby only one of the elements of such an array is energized as a transmitter and receiver at one time, the others being later energized successively, so as to duplicate the single, moving, transducer of the usual synthetic aperture procedure. This was described in connection with FIG. 9 in the 1970 ultrasonic patent referred to. It will be obvious to one skilled in the art that the process described here can also be applied to such stationary arrays, whereby, for example, the array element next to the active transmit receive element is used only as a receiver, and would be skipped over as the energizing of the next (the third) transducer takes place. Thus a pulse would be radiated only from every other transducer, again permitting the maximum range to be doubled. If groups of four rather than two transducers are so utilized, (with three of these then acting as receive-only units) and the radiating unit jumping over to the fourth unit, as the moving transducer process is simulated, the maximum range will be increased by a factor of four.

Having described the invention, what is claimed is:

1. A wave imaging system, in which pulses of energy are radiated at definite intervals from a transmit-receive transducer which moves relative to the irradiated area at constant speed along a straight line, comprising one or more receive-only transducers, positioned along the line of motion of the transmit receive transducer, and moving at the same constant speed and along the same straight line as the transmit-receive transducer, the echoes of said pulses of energy being received by all of said transducers, means for synchronous detection of the received signals, and storage and processing means connected to the synchronous detection means for forming an image of the irradiated area.

2. An imaging system, as described in claim 1, wherein the transmit-receive and receive-only transducers comprise a long line of fixed transducers having electronic switch means for effecting the progressive movement relative to the irradiated area.

* * * * *